UNITED STATES PATENT OFFICE.

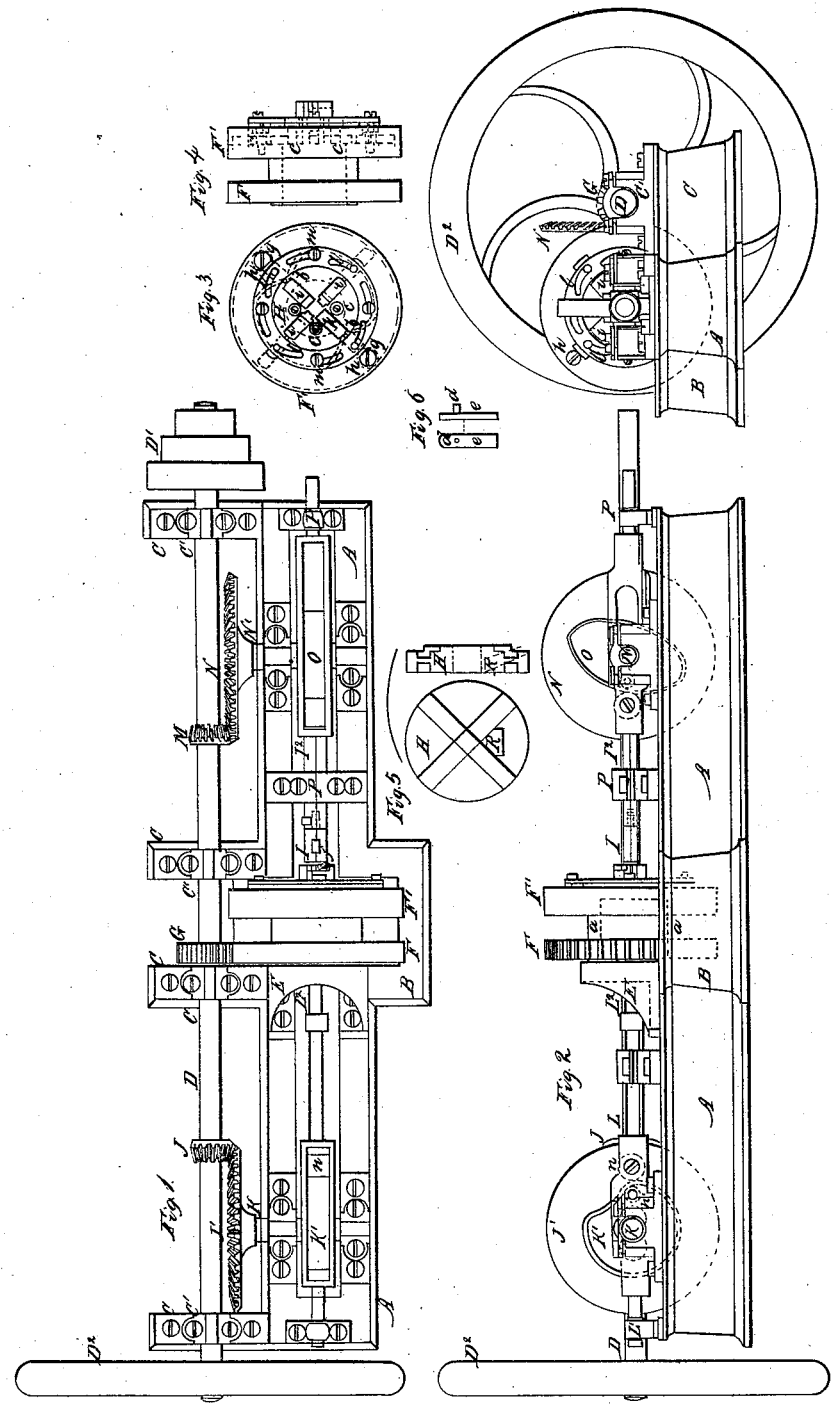

EDWARD PAYE AND SAML. HALL, OF NEW YORK, N. Y.

MACHINE FOR FORGING NUTS.

Specification of Letters Patent No. 18,156, dated September 8, 1857.

*To all whom it may concern:*

Be it known that we, EDWARD PAYE and SAMUEL HALL, both of the city, county, and State of New York, have invented a new and useful Machine for Forging Nuts by Cutting, Punching, and Hammering; and we do hereby declare that the same is described and represented in the following specifications and drawings.

To enable others skilled in the art to make and use our invention we will proceed to describe its construction and operation, referring to the drawings, in which the same letters indicate like parts in each of the figures.

Figure 1, is a plan of the machine and Fig. 2 an elevation. Figs. 3 and 4 is a plan or face view of the cam collar and an elevation, Fig. 5, is a plan of the rear of the disk and an elevation, Fig. 6, is a plan and elevation of one of the sliding hammers. Fig. 7, is an elevation of one end of the machine.

The nature of our invention consists in the arrangement of a series of sliding hammers to hammer the edges of the nut in combination with a punch which cuts off and compresses the nut and a punch which perforates it; so that a piece of iron is cut off from the end of a heated bar and perforated then hammered upon the edges and compressed and hammered again so as to make a more perfect nut than is made by hand hammering. Also in arranging same rollers to act against the ends of the hammers and force them against the nut so as to relieve the pins in or projections on the hammers and the cam groove which operates them.

In the accompanying drawings A, A, is a rectangular frame of cast metal with an enlargement in the middle as shown at B, and four projections C, C, for the boxes C′, C′, which support the shaft D, which is fitted to turn in them and provided with a series of pulleys D′ to which a belt may be applied to operate the machine. The shaft D, is also provided with a fly wheel $D^2$ to equalize the motion of the machine.

The stand E, may be made in the form shown and bolted to the frame A, so as to hold it firmly in its place, this stand is provided with a circular hub shown by dotted lines *a, a,* to which hub the gear F, is fitted so as to turn freely and carry the cam collar F′, fastened to the gear F, which gear is turned by the pinion G, fastened to the shaft D, as shown in the drawing.

The cam collar F′, may be made in the form represented, and provided with a groove made in the form shown by the dotted lines *b b* Fig. 3.

There is a circular cavity in the collar F′, to which the disk H, is fitted and fastened by the screws *c, c,* to the hub *a, a*. This disk H, Fig. 5, has two grooves on each side crossing each other at right angles; the grooves on the side next to the hub *a, a,* are occupied by four sliding hammers *e, e,* (one of which is shown in Fig. 6,) which are provided with studs *d,* fitted to the cam groove *b,* which traverses the hammers *e, e,* the cam being so constructed as to force the two hammers which are opposite to each other, toward each other at the same time, so that the nut is hammered on the two opposite sides at the same time, by each set of hammers alternately in succession; and when the hammers are carried against the nut by the groove *b,* the rollers *g, g,* on the screws *h, h,* in the collar strike the rear ends of the hammers, which are rounded, and force them against the nut with a blow like the blow of a hammer operated by hand, so as to condense the iron in the nut like hand hammering.

The grooves on the front side of the disk H, are occupied by the sliding guides *i, i, i,* and by the sliding die on cutter *k,* all of which are fitted to traverse in the grooves and provided with pins fitted to the cam slots *l, l,* in the circle H′, which is fastened to the disk H, by the screws *m, m,* which pass through slots in the circle H′ as shown in the drawing so that by loosening the screws the circle may be turned and the die and guides adjusted to the punch I, and the screws tightened so as to fasten the circle and hold the die and guides as required.

The pinion J, is fastened to the shaft D, so as to turn the gear J′, just as fast as the gear F, is turned by the pinion G, which gear J′, is fastened to the shaft K, which turns in boxes fastened to the frame A, as shown in the drawing and carries the cam K′, fastened to it which is made in the form shown in Fig. 2. The traversing bar, L, is made in the form shown in the drawing, one end being fitted to traverse in the box L′, fastened to the frame, A, and the other end is provided with a socket for the shank of the punch L² fitted to traverse in the stand E, to perforate the nuts cut off by the punch I and die k.

The traversing bar L is provided with a long slot in one direction for the cam k', which acts against the roller n, in the slot and forces the punch L², forward; the punch and bar being drawn back by the points of the screws n', n', acted upon by the interior of the cam k', as shown in the drawing, the traversing bar L being provided with slots shown by dotted lines in Fig. 2, to allow it to traverse while the shaft k, turns in the slots o, o.

The pinion M, is fastened to the shaft D, and turns the gear N, on the shaft N' just as fast as the other two pinions turn the other two gears; which shaft N' is fitted to turn in the boxes fastened to the frame A, as shown in the drawing, and has the cam O, fastened to it, which cam is made in the form represented in Fig. 2, so as to operate the traversing bar I², and punch I, twice while the punch L² is operated once. The traversing bar I², is made in the form shown in the drawing and fitted to traverse in the boxes P, P, fastened to the frame A, as shown in the drawing; it is constructed in the same manner and provided with the same devices which have already been described as belonging to the bar L. The shank of the punch I, being fitted to the socket in the end of the bar I².

The punch I, is perforated to receive the end of the punch L² and the piece punched out of the nut by it and forced into the opening j, through the punch I so as to fall out of the punch. There is a slot R, made in the disk H, shown by dotted lines through which the nuts made fall out of the machine when they are finished.

The machine having been constructed and completed as above described, a bar of iron a little narrower than the width of the punch I, and of a proper thickness is properly heated and the machine set in motion, when the end of the bar is placed between the guides i, i, when the punch I comes forward and cuts off a piece to form a nut and forces it onto the punch L², which perforates it and then it is compressed by the punch I, which forces it against the end of the hub a, a, when the punch I, is drawn back and the nut is hammered by each pair of hammers successively; when the punch I, is forced forward again and compresses the nut a second time; when it is hammered again by each pair of hammers to complete it; when the punch L² which has remained in the nut while it was being hammered and compressed is withdrawn by the cam K', and the finished nut drops through the hole R made in the disk for that purpose, and falls out of the machine. The heated bar may now be placed between the guides i, i, and another piece cut off and perforated, and hammered to form another nut as above described; the pieces punched out of the nut by the punch L² being forced into the punch I drop out through the opening j.

If a hexagonical nut is to be made six hammers may be used, and the cam should be so constructed as to make each three hammers which form a triangle, strike at once so as to act toward each other upon the nut being forged and hammer it without having a tendency to bend the punch L².

If an octagonal nut is to be made eight hammers may be used and the cam which operates them may be made so as to operate four alternate hammers at once or only two hammers which are opposite to each other as may be preferred.

The nuts made by our invention above described are of a uniform size and thickness and far superior to those made by hand.

We believe we have described the construction and operation of our invention so as to enable any person skilled in the art to make and use it and we will now state what we desire to secure by Letters Patent, to wit.

We claim—

The hammering apparatus as described in combination with the punch I, and the punch L² arranged and operating in the manner set forth for making nuts, substantially as described.

EDWARD PAYE.
SAMUEL HALL.

Witnesses:
   J. DENNIS, Jr.,
   JOHN S. HOLLINGSHEAD.